(12) United States Patent
D'Penha

(10) Patent No.: US 9,213,693 B2
(45) Date of Patent: Dec. 15, 2015

(54) MACHINE LANGUAGE INTERPRETATION ASSISTANCE FOR HUMAN LANGUAGE INTERPRETATION

(75) Inventor: Lindsay D'Penha, Salinas, CA (US)

(73) Assignee: Language Line Services, Inc., Monterey, CA (US)

( * ) Notice: Subject to any disclaimer, the term of this patent is extended or adjusted under 35 U.S.C. 154(b) by 126 days.

(21) Appl. No.: 13/438,812

(22) Filed: Apr. 3, 2012

(65) Prior Publication Data

US 2013/0262079 A1 Oct. 3, 2013

(51) Int. Cl.
*G06F 17/28* (2006.01)

(52) U.S. Cl.
CPC .......... *G06F 17/2836* (2013.01); *G06F 17/289* (2013.01)

(58) Field of Classification Search
CPC .................................................. G06F 17/2836
USPC ........................................................ 704/2–5
See application file for complete search history.

(56) References Cited

U.S. PATENT DOCUMENTS

| | | | |
|---|---|---|---|
| 5,392,343 A | 2/1995 | Davitt | |
| 6,985,850 B1 | 1/2006 | Scanlan | |
| 2002/0169592 A1 | 11/2002 | Aityan | |
| 2004/0264677 A1 | 12/2004 | Horvitz | |
| 2007/0294076 A1* | 12/2007 | Shore et al. | 704/2 |
| 2008/0300860 A1 | 12/2008 | Marlow | |
| 2009/0089042 A1 | 4/2009 | Wald et al. | |
| 2009/0119091 A1* | 5/2009 | Sarig | 704/2 |
| 2009/0132230 A1* | 5/2009 | Kanevsky et al. | 704/2 |
| 2009/0265175 A1 | 10/2009 | Fang | |
| 2009/0326913 A1* | 12/2009 | Simard et al. | 704/2 |
| 2010/0121629 A1* | 5/2010 | Cohen | 704/2 |
| 2010/0179803 A1* | 7/2010 | Sawaf et al. | 704/2 |
| 2010/0198580 A1 | 8/2010 | Klinefelter | |
| 2010/0223048 A1 | 9/2010 | Lauder | |
| 2011/0077933 A1 | 3/2011 | Miyamoto | |
| 2011/0209038 A1 | 8/2011 | Travieso | |
| 2011/0225104 A1 | 9/2011 | Soricut | |
| 2012/0022852 A1* | 1/2012 | Tregaskis et al. | 704/3 |

* cited by examiner

*Primary Examiner* — Douglas Godbold
(74) *Attorney, Agent, or Firm* — Patent Ingenuity, P.C.; Samuel K. Simpson

(57) ABSTRACT

A language interpretation system receives a request for an interpretation of a voice communication between a first language and a second language. Further, the language interpretation system provides the request to a human language interpreter. In addition, a machine language interpreter translates the voice communication into a set of text data. The text data is sent to a display device that displays the text during a human language interpretation performed by the human language interpreter.

20 Claims, 5 Drawing Sheets

_204_

Realtime Interpretation Aid Screen

English: I am sick. I have some pain in my left chest. My name is John Doe, and I live at 123 Elm Street. My phone number is 123-123-1234.

Spanish: Estoy enfermo. Tengo algo de dolor en el pecho izquierdo. Mi nombre es John Doe, y yo vivo en 123 Elm Street. Mi número telefónico es 123-123-1234.

Terminology:

chest: pecho heart: corazón lungs: los pulmones

Addition medical terms

Critical Conversation Information:

John Doe

123 Elm Street 123-123-1234

*Figure 3*

MACHINE LANGUAGE INTERPRETATION ASSISTANCE FOR HUMAN LANGUAGE INTERPRETATION

BACKGROUND

1. Field

This disclosure generally relates to the field of language interpretation. More particularly, the disclosure relates to machine language interpretation and human language interpretation.

2. General Background

The language interpretation industry continues to grow with the increasing demand for language interpretation. Language interpretation provides assistance to a variety of fields. For example, live language interpretation reduces the risk of errors resulting from language barriers in public safety for first responders for police, ambulance service, hospitals, and disaster relief efforts.

Language interpretation is typically performed by a human language interpreter. However, the qualification level of the human language interpreter has to be high to provide optimal language interpretation. Further, a human language interpreter may not have captured all of the nuances of the conversation because the human language interpreter may have a different cultural context than that of the speakers.

SUMMARY

In one aspect of the disclosure, a process is provided. The process receives, at a language interpretation system, a request for an interpretation of a voice communication between a first language and a second language. Further, the process provides, at the language interpretation system, the request to a human language interpreter. In addition, the process translates, with a machine language interpreter, the voice communication into a set of text data. The process also sends the text data to a display device that displays the text during a human language interpretation performed by the human language interpreter.

In another aspect of the disclosure, a computer program product is provided. The computer program product comprises a computer useable medium having a computer readable program. The computer readable program when executed on a computer causes the computer to receive, at a language interpretation system, a request for an interpretation of a voice communication between a first language and a second language. Further, the computer readable program when executed on the computer causes the computer to provide, at the language interpretation system, the request to a human language interpreter. In addition, the computer readable program when executed on the computer causes the computer to translate, with a machine language interpreter, the voice communication into a set of text data. The computer readable program when executed on the computer also causes the computer to send the text data to a display device that displays the text during a human language interpretation performed by the human language interpreter.

In yet another aspect of the disclosure, a system is provided. The system includes a reception module that receives, at a language interpretation system, a request for an interpretation of a voice communication between a first language and a second language. Further, the system includes a routing module that provides, at the language interpretation system, the request to a human language interpreter. In addition, the system includes a machine language interpreter that translates the voice communication into a set of text data. The system also includes a transmission module that sends the text data to a display device that displays the text during a human language interpretation performed by the human language interpreter.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 3 illustrates an example of content that may be displayed in the display.

DETAILED DESCRIPTION

A method, computer program product, apparatus, and system are provided for machine language interpretation assistance for human language interpretation. Accurate human language interpretation depends on several factors. An example factor is knowledge of both the source language and the target language. The human language interpreter may have a weakness in either or both, which may affect the accuracy of the language interpretation. Another example factor is knowledge in particular industry terminology. For example, language interpretation may be requested in a medical context. Accordingly, a human language interpretation involves knowledge of medical terminology in both the source language and the target language. Yet another example factor is context. The human language interpreter may have to have some cultural context to interpret the conversation.

In one embodiment, a machine language interpretation system may provide assistance to aid the human language interpreter during a conversation in which the human language interpreter providing language interpretation between two different languages. As a result, a human language interpreter who is not well versed in the particular industry terminology or does not have a particular industry skill set may augment his or her interpretation with the assistance of the machine language interpretation system. Therefore, the participants in the conversation may benefit from a more accurate language interpretation performed by the human language interpreter.

Figure 1:
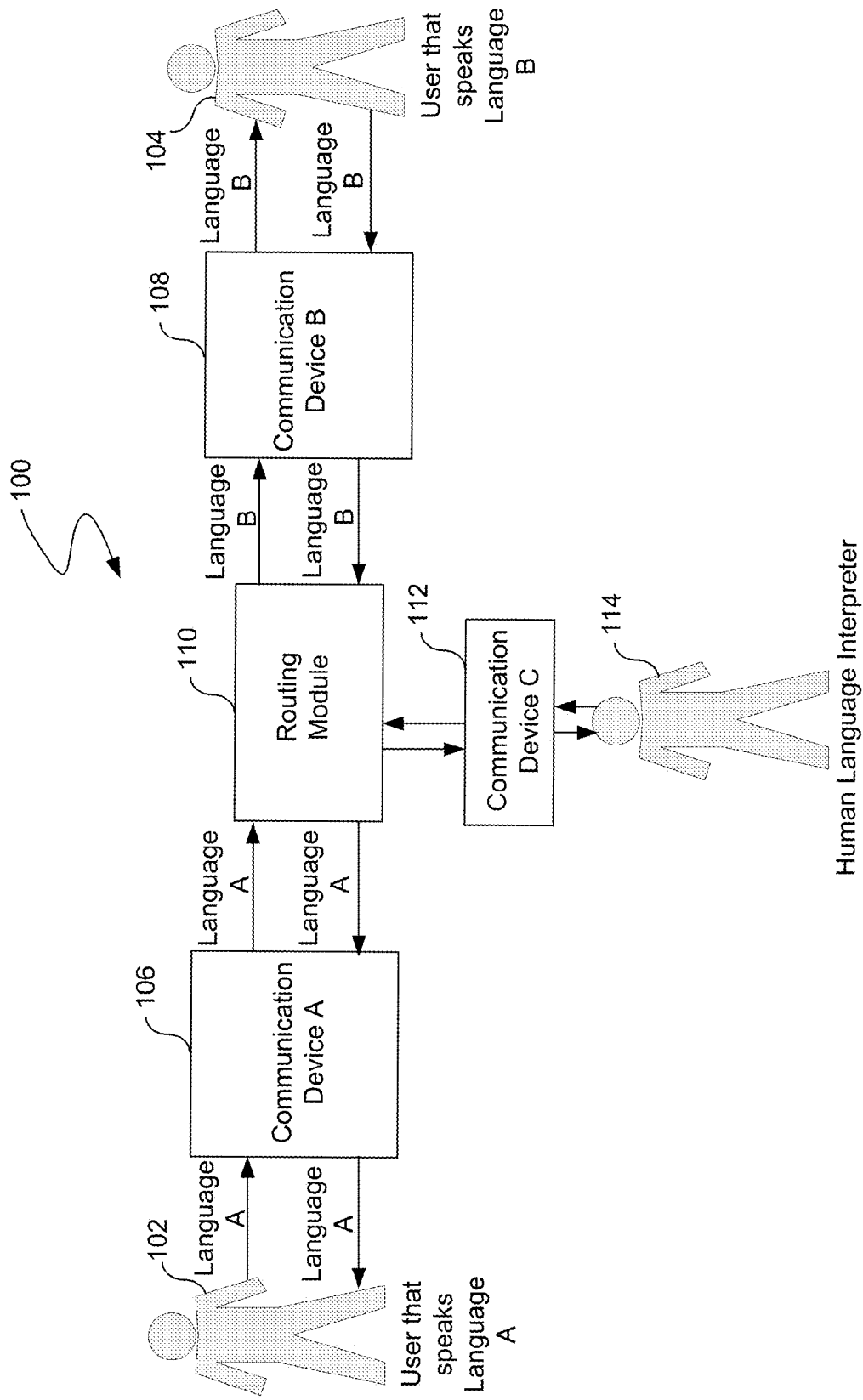
FIG. 1 illustrates a language interpretation system that may be utilized to provide a human language interpretation service.

FIG. 1 illustrates a language interpretation system 100 that may be utilized to provide a human language interpretation service. As an example, a user 102 that speaks language A may wish to converse with a user 104 that speaks language B. In one embodiment, the users may utilize communication devices. For example, the user 102 that speaks language A may utilize a communication device A 106. Further, as an example, the user 104 that speaks language B may utilize a communication device B 108. A communication device as provided for herein may be a telephone, smart phone, cell phone, tablet device, personal computer ("PC"), laptop, notebook, or the like. The users may utilize their respective communication devices to connect through a routing module 110 to a communication device C 112 of a human language interpreter 114. As an example, the routing module 110 may be operated by a language interpretation service provider and/or a telecommunications provider. The users may connect through a network such as a public switch telephone network ("PSTN"), Internet, local area network ("LAN"), wide area network ("WAN"), Ethernet connection, wireless network, or the like. In one embodiment, the users transmit voice messages to one another through their respective communication devices. Further, in one embodiment, the voice communications are spoken by the user. In an alternative embodiment, the voice communications are interpreted from textual input from the users to voice communications.

The human language interpreter 114 interprets the voice communication according to the desired language for the users. For example, the human language interpreter 114 may interpret the voice communication from language A from the user 102 that speaks language A into language B for the user 104 that speaks language B. Further, the human language interpreter 114 may interpret the voice communication from language B from the user 104 that speaks language B into language A for the user 102 that speaks language A.

Figure 2:
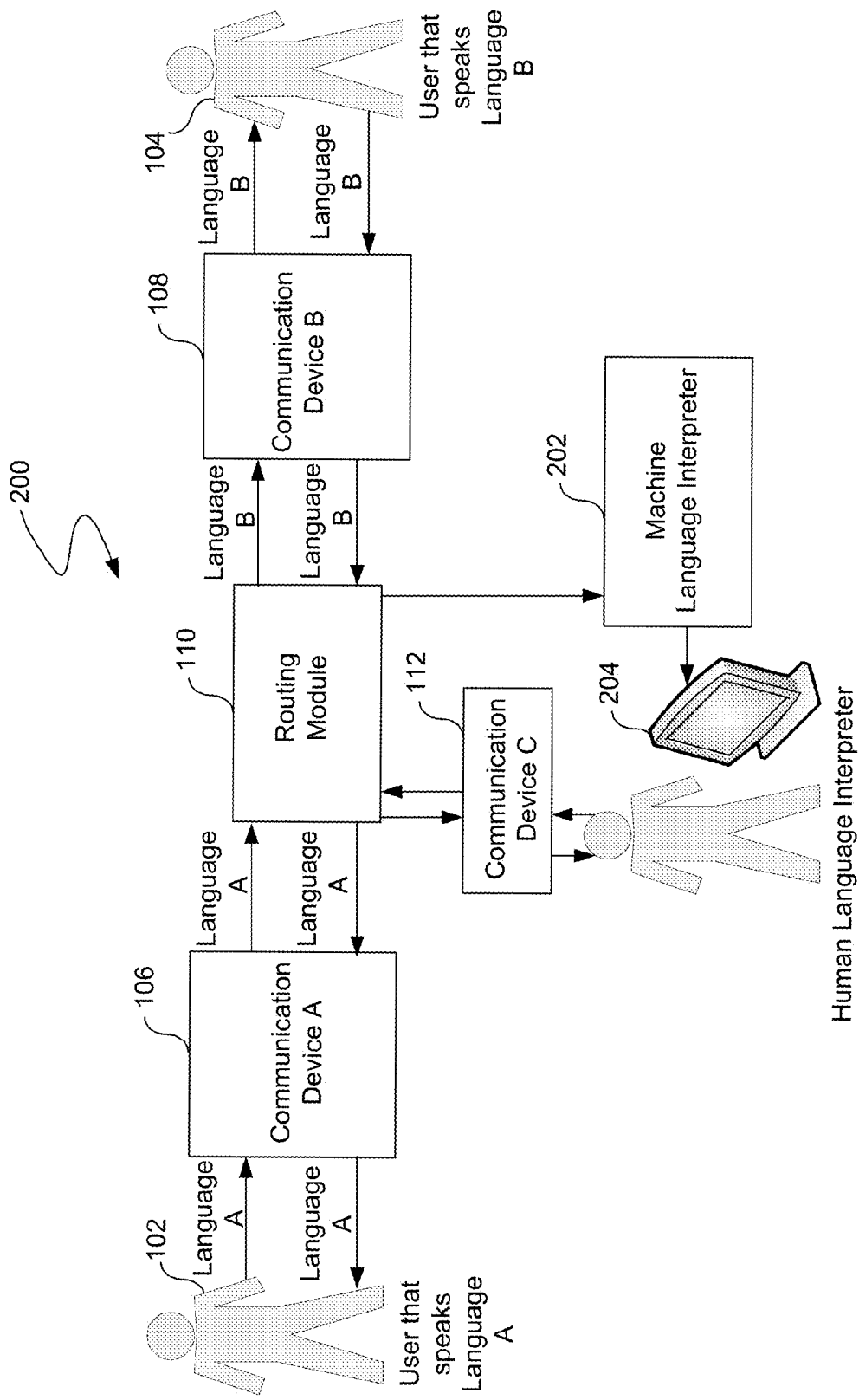
FIG. 2 illustrates language interpretation system that may be utilized to provide machine language interpreter assistance to the human language interpreter.

FIG. 2 illustrates language interpretation system 200 that may be utilized to provide machine language interpreter assistance to the human language interpreter 114. In one embodiment, a machine language interpreter 202 may be listening to the interpretation session between the human language interpreter 114 and the users speaking different languages. The listening may be performed through communication channels such as a phone call, computer voice over IP call, or a like mechanism that transmits a conversation between two users and the human language interpreter 114 to the machine language interpreter 202. As an example, the routing module 110 may perform the routing of the conversation to the machine language interpreter 202. However, other possible configurations may be utilized.

As the conversation takes place, the machine language interpreter 202 may translate the conversation to text and display the text on a display 204 such as a graphical user interface ("GUI") that is accessible by the human language interpreter 114. A variety of other types of visual aids may be utilized instead of a GUI. The human language interpreter 114 may monitor the display 204 and tailor the human language interpretation according to the data provided by the display 204.

In one embodiment, the machine language interpreter 202 is automated. In other words, the machine language interpreter 202 may operate without manual intervention. For example, the machine language interpreter 202 may receive the voice communications and automatically provide language translation for the voice communications to the human language interpreter 114. The machine language interpreter 202 may be a hardware device. Alternatively, the machine language interpreter 202 may be a set of computer implemented instructions residing on a computing device. In yet another alternative, the machine language interpreter 202 is a combination of a hardware device and a set of computer implemented instructions residing on the hardware device. With any of the configurations provided for herein, a hardware processor may be utilized to implement the machine language interpreter 202.

The display 204 may illustrate a variety of different types of information. As an example, the words that are recognized in real-time from the source language may be displayed. Further, as an example, the translated words and sentences from the target language may be displayed in real-time. In addition, as an example, particular facts that a human language interpreter may not typically retain may be displayed. For example, addresses, telephone numbers, account numbers, or the like may be displayed. As another example, contextual terminology, vocabulary, and language aides that would aid the human language interpreter 114 during the language interpretation session may be displayed.

In another embodiment, multiple machine language interpreters may be utilized. Further, the display 204 may display the suggested translations from each of the machine language interpreters. In one embodiment, a scoring system may be utilized to score each translation received from a machine language interpreter by the human language interpreter. As an example, the score may represent a probability of accuracy. Accordingly, the human language interpreter 114 may utilize the scores to help select which translation to utilize.

FIG. 3 illustrates an example of content that may be displayed in the display 204. For instance, the display 204 may illustrate in real-time English and Spanish textual translations of a conversation between two users. As the example conversation occurs within a medical context, various medical terminology may be displayed in both languages. Further, various conversation information such as name, address, account number, or the like may be displayed in the display 204.

Accordingly, the human language interpreter 114 that may have a low skill level for a particular language, industry terminology, or the like, may attain a higher skill level with the assistance of the machine language interpreter 110. As a result, users may benefit from receiving a more accurate language interpretation than may otherwise be received.

Figure 4:
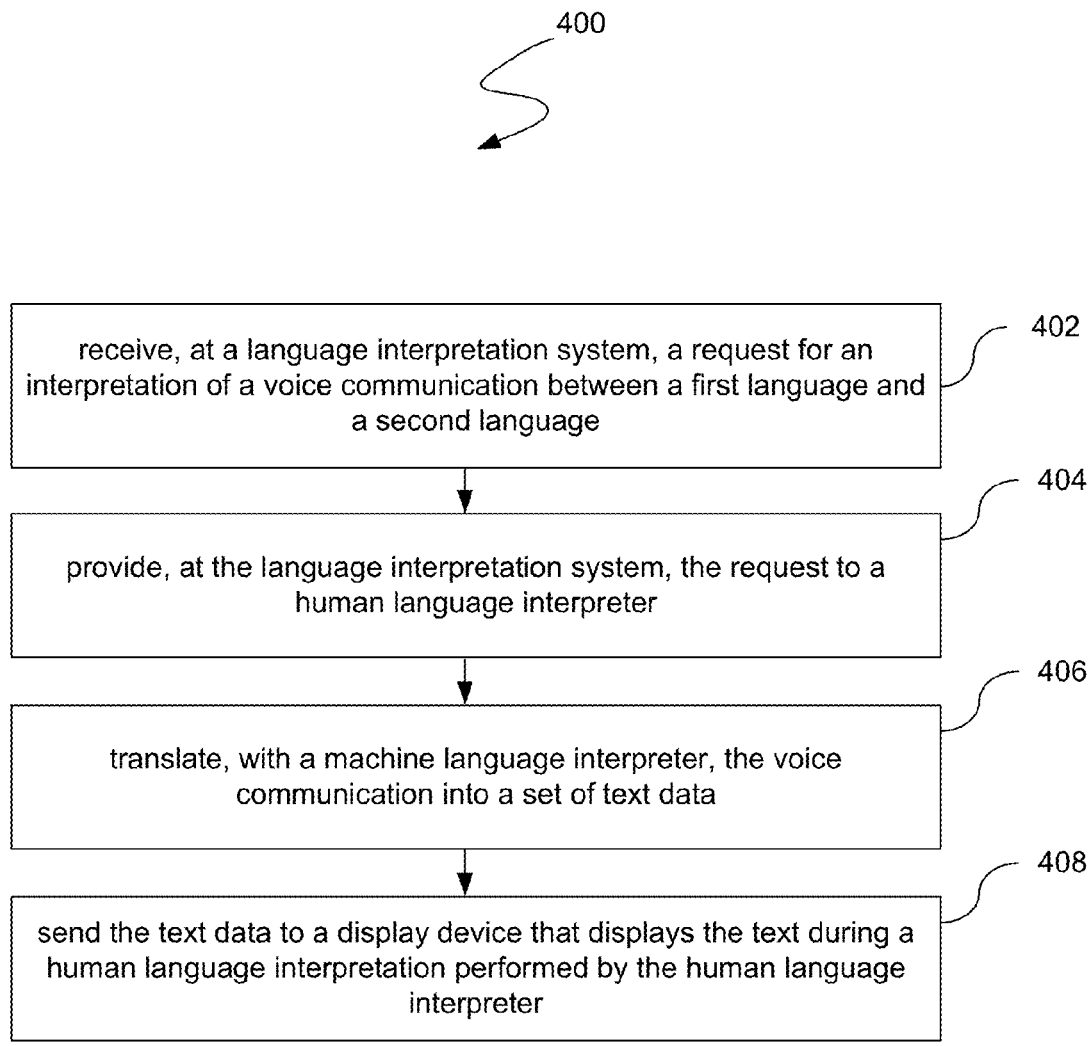
FIG. 4 illustrates a process that provides assistance from a machine language interpreter to a human language interpreter.

FIG. 4 illustrates a process 400 that provides assistance from a machine language interpreter to a human language interpreter. At a process block 402, the process 400 receives, at a language interpretation system, a request for an interpretation of a voice communication between a first language and a second language. Further, at a process block 404, the process 400 provides, at the language interpretation system, the request to a human language interpreter. In addition, at a process block 406, the process 400 translates, with a machine language interpreter, the voice communication into a set of text data. At a process block 408, the process 400 also sends the text data to a display device that displays the text during a human language interpretation performed by the human language interpreter.

In other configurations, alternative or additional aids may be provided to the human language interpreter. For example, audible data may be provided to the human language interpreter. As an example, the machine language interpreter may translate a voice communication into text. That text may then be provided audibly to the human language interpreter through an automated system. In other words, the text may be placed into an audio format for listening by the human language interpreter.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of storing those instructions and include a CD-ROM, DVD, magnetic or other optical disc, tape, silicon memory, e.g., removable, non-removable, volatile or non-volatile, etc.

A computer is herein intended to include any device that has a general, multi-purpose or single purpose processor as described above. For example, a computer may be a set top box, cell phone, smart phone, tablet device, portable media player, video player, or the like.

Figure 5:
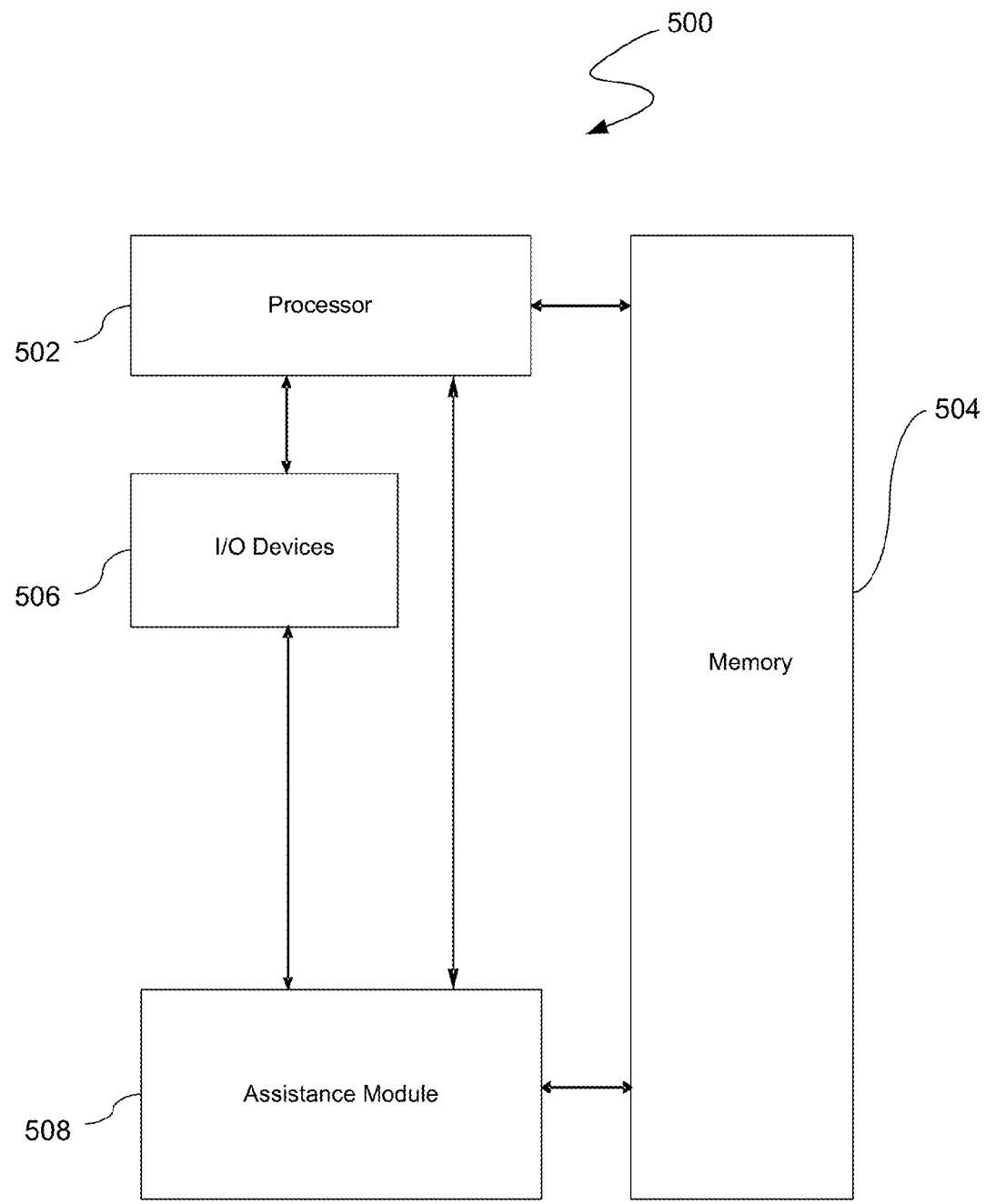
FIG. 5 illustrates a block diagram of a system that provides assistance from a machine language interpreter to a human language interpreter.

FIG. 5 illustrates a block diagram of a system 500 that provides assistance from a machine language interpreter to a human language interpreter. In one embodiment, the system 500 is implemented utilizing a general purpose computer or any other hardware equivalents. Thus, the system 500 comprises a processor 502, a memory 504, e.g., random access memory ("RAM") and/or read only memory (ROM), various input/output devices 506, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)), and an assistance module 508.

It should be understood that the assistance module 508 may be implemented as one or more physical devices that are coupled to the processor 502. Alternatively, the assistance module 508 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor 502 in the memory 504 of the computer. As such, the assistance module 508 (including associated data structures) of the present disclosure may be stored on a computer readable medium, e.g., RAM memory, magnetic or optical drive or diskette and the like. The system 500 may be utilized for a hardware implementation of any of the configurations provided herein.

It is understood that the computer program products, apparatuses, systems, and processes described herein may also be applied in other types of apparatuses, systems, and processes. Those skilled in the art will appreciate that the various adaptations and modifications of the embodiments of the apparatuses, systems, and processes described herein may be configured without departing from the scope and spirit of the present computer program products, apparatuses, systems, and processes. Therefore, it is to be understood that, within the scope of the appended claims, the present computer program products, apparatuses, systems, and processes may be practiced other than as specifically described herein.

I claim:

1. A method comprising:
receiving, at a language interpretation system, a request for a real time interpretation performed by a human language interpreter of a voice communication between a first voice communication participant speaking a first language and a second voice communication participant speaking a second language during the voice communication, the request being received from the first voice communication participant;
providing, at the language interpretation system, the request to the human language interpreter;
translating, with a machine language interpreter, the voice communication into a set of text data, the set of text data having a plurality of translated sentences translated in real time during the voice communication; and
sending the text data to a display device that displays the set of text data during a verbal human language interpretation of the voice communication performed by the human language interpreter in real time during the voice communication so that the human language interpreter utilizes the set of text data to perform the verbal human language interpretation, the verbal human language interpretation being communicated by the human language interpreter to the second voice communication participant without the machine language interpreter, the verbal human language interpretation being unmodified prior to and during the communication of the human language interpreter to the second voice communication participant.

2. The method of claim 1, further comprising sending additional text to the display device, the additional text including contextual terminology corresponding to the voice communication.

3. The method of claim 1, further comprising sending additional text to the display device, the additional text including contextual vocabulary corresponding to the voice communication.

4. The method of claim 1, further comprising sending additional text to the display device, the additional text including contextual language corresponding to the voice communication.

5. The method of claim 1, further comprising sending additional text to the display device, the additional text including user information corresponding to a user that performs the request.

6. The method of claim 1, wherein the text is displayed in real-time.

7. The method of claim 1, further comprising transferring, with a routing module, the voice communication to the machine language interpreter.

8. A computer program product comprising a non-transitory computer readable storage device having a computer readable program stored thereon, wherein the computer readable program when executed on a computer causes the computer to:
receive, at a language interpretation system, a request for a real time interpretation performed by a human language interpreter of a voice communication between a first voice communication participant speaking a first language and a second voice communication participant speaking a second language during the voice communication, the request being received from the first voice communication participant;
provide, at the language interpretation system, the request to a human language interpreter;
translate, with a machine language interpreter, the voice communication into a set of text data; and
send the text data to a display device that displays the set of text data during a verbal human language interpretation of the voice communication performed by the human language interpreter in real time during the voice communication so that the human language interpreter utilizes the set of text data to perform the verbal human language interpretation, the human language interpretation being communicated by the human language interpreter to the second voice communication participant without the machine language interpreter, the verbal human language interpretation being unmodified prior to and during the communication of the human language interpreter to the second voice communication participant.

9. The computer program product of claim 8, wherein the computer is further caused to send additional text to the display device, the additional text including contextual terminology corresponding to the voice communication.

10. The computer program product of claim 8, wherein the computer is further caused to send additional text to the display device, the additional text including contextual vocabulary corresponding to the voice communication.

11. The computer program product of claim 8, wherein the computer is further caused to send additional text to the display device, the additional text including contextual language corresponding to the voice communication.

12. The computer program product of claim 8, wherein the computer is further caused to send additional text to the display device, the additional text including user information corresponding to a user that performs the request.

13. The computer program product of claim 8, wherein the text is displayed in real-time.

14. The computer program product of claim 8, wherein the computer is further caused to transfer, with a routing module, the voice communication to the machine language interpreter.

15. A system comprising:
- a reception module that receives, at a language interpretation system, a request for a real time interpretation performed by a human language interpreter of a voice communication between a first voice communication participant speaking a first language and a second voice communication participant speaking a second language during the voice communication, the request being received from the first voice communication participant;
- a routing module that provides, at the language interpretation system, the request to a human language interpreter;
- a machine language interpreter that translates the voice communication into a set of text data; and
- a transmission module that sends the set of text data to a display device that displays the text during a verbal human language interpretation of the voice communication performed by the human language interpreter in real time during the voice communication so that the human language interpreter utilizes the set of text data to perform the verbal human language interpretation, the human language interpretation being communicated by the human language interpreter to the second voice communication participant without the machine language interpreter, the verbal human language interpretation being unmodified prior to and during the communication of the human language interpreter to the second voice communication participant.

16. The system of claim 15, wherein the transmission module sends additional text to the display device, the additional text including contextual terminology corresponding to the voice communication.

17. The system of claim 15, wherein the transmission module sends additional text to the display device, the additional text including contextual vocabulary corresponding to the voice communication.

18. The system of claim 15, wherein the transmission module sends additional text to the display device, the additional text including contextual language corresponding to the voice communication.

19. The system of claim 15, wherein the transmission module sends additional text to the display device, the additional text including user information corresponding to a user that performs the request.

20. The system of claim 15, wherein the text is displayed in real-time.

* * * * *